US006835337B2

(12) United States Patent
Sasaki et al.

(10) Patent No.: US 6,835,337 B2
(45) Date of Patent: Dec. 28, 2004

(54) METHOD FOR CONTROLLING THE FORWARD MOVEMENT SPEED OF THE SCREW IN AN INJECTION MOLDING MACHINE (75) Inventors: Kiyoshi Sasaki, Mishima (JP); Yasumasa Sugiyama, Mishima (JP); Hiroshi Katsuta, Gotemba (JP); Hirofumi Tateyama, Fukushima (JP); Kazuyuki Ushizaka, Fukushima (JP); Atsuhiro Suzuki, Fukushima (JP)

(73) Assignee: Munekata Co., Ltd., Fukushima (JP)

( * ) Notice: Subject to any disclaimer, the term of this patent is extended or adjusted under 35 U.S.C. 154(b) by 269 days.

(21) Appl. No.: 10/133,592

(22) Filed: Apr. 29, 2002

(65) Prior Publication Data
US 2002/0163097 A1 Nov. 7, 2002

(30) Foreign Application Priority Data

May 7, 2001 (JP) ........................................ 2001-136458
May 7, 2001 (JP) ........................................ 2001-136459

(51) Int. Cl.$^7$ ............................................ B29C 45/77
(52) U.S. Cl. .................... 264/40.1; 264/328.1; 425/145
(58) Field of Search .............................. 264/40.1, 40.5, 264/328.1, 40.7; 425/145, 149

(56) References Cited

U.S. PATENT DOCUMENTS

| 5,514,311 A | | 5/1996 | Shimizu et al. | |
| 5,595,693 A | * | 1/1997 | Fujita et al. | ............... 264/40.1 |
| 5,733,486 A | * | 3/1998 | Hayasi et al. | ............... 264/40.1 |
| 5,817,258 A | | 10/1998 | Ito et al. | |
| 6,073,059 A | * | 6/2000 | Hayashi et al. | ............. 700/204 |
| 6,108,587 A | * | 8/2000 | Shearer et al. | ............. 700/200 |
| 6,325,954 B1 | * | 12/2001 | Sasaki et al. | ............. 264/40.1 |
| 6,632,079 B1 | * | 10/2003 | Kazmer et al. | ............. 425/145 |

FOREIGN PATENT DOCUMENTS

| DE | 44 46 857 A1 | | 6/1995 |
| EP | 0 744 267 A2 | | 11/1996 |
| GB | 2 286 145 A | | 8/1995 |
| GB | 2 302 667 A | | 1/1997 |
| JP | 6-170899 | * | 6/1994 |
| JP | 07186231 A | | 7/1995 |
| JP | 10-113970 | * | 5/1998 |
| JP | 10-315290 | * | 12/1998 |

* cited by examiner

Primary Examiner—Jill L. Heitbrink
(74) Attorney, Agent, or Firm—Pillsbury Winthrop LLP (57) ABSTRACT In the filling step, the forward movement speed of the screw is controlled in accordance with a predetermined speed pattern until the screw reaches a deceleration initiation point, LS4B. After the screw reaches LS4B, a deceleration step is started. In the deceleration step, the forward movement speed of the screw is controlled in a feedback manner such that the internal pressure of the mold reaches a predetermined target pressure. When the screw reaches a pressure holding initiation point, LS4 (or pressure holding initiation time, TR2), the pressure holding step is started. In the pressure holding step, the target pressure, which is a function of time, is changed with time in accordance with a program. When the operation goes to the pressure holding step, the set of PID coefficients within the feedback control loop are replaced by different set of PID coefficients.

5 Claims, 5 Drawing Sheets

FIG. 9

# METHOD FOR CONTROLLING THE FORWARD MOVEMENT SPEED OF THE SCREW IN AN INJECTION MOLDING MACHINE

CROSS-REFERENCE TO RELATED APPLICATIONS

This application is based upon and claims the benefit of priority from the prior Japanese Patent Applications No. 2001-136458, filed May 7, 2001; and No. 2001-136459, filed May 7, 2001, the entire contents of both of which are incorporated herein by reference.

BACKGROUND OF THE INVENTION

1. Field of the Invention

The present invention relates to a method for controlling an injection molding machine, and more particularly, to a method for controlling the forward movement speed of a screw in a heating barrel when a molten resin is fed into a mold.

2. Description of the Related Art

In such an injection-molding machine, when a molten resin stored in a heating barrel is fed into a mold by advancing a screw within the heating barrel, the following method has been employed for controlling the speed of the screw.

To explain more specifically, the forward movement speed of the screw is controlled in accordance with a predetermined speed pattern until the screw reaches a predetermined control-mode switching position (hereinafter referred to as a "deceleration initiation point"). After the screw reaches the predetermined deceleration initiation point, the forward movement speed of the screw is gradually reduced in a feedback manner such that the internal pressure of a hydraulic cylinder for driving the screw reaches a predetermined target pressure (which has been set to correspond to a target internal pressure of the mold). Subsequently, when the screw reaches a predetermined position (called a "pressure holding initiation point"), or when the time passes from the initiation of the forward movement of the screw reaches a predetermined time (called a "pressure holding initiation time"), the internal pressure of the hydraulic cylinder is controlled in a feedback manner so as to be maintained at the target pressure.

The step during which the screw reaches the pressure holding initiation point (or the elapsed time from the initiation of forward moving of the screw reaches the pressure holding initiation time) is called a "filling step". After the screw reaches the pressure holding initiation point (after the pressure holding initiation time), the step is called a "pressure holding step".

However, in such a conventional controlling method, the internal pressure of the mold is reduced in the pressure holding step since the molten resin flows within the mold, with the result that the internal pressure of the hydraulic cylinder does not accurately correspond to that of the mold cavity. Therefore, it is difficult to accurately control the internal pressure of the mold, preventing improvement of products in quality and yield.

To overcome such a problem, Japanese Patent No. 2756077 (corresponding to Japanese Publication No. 7186231 A) has proposed a method comprising detecting the internal pressure of the mold in the pressure holding step and setting the internal pressure so as to correspond to the predetermined target value, thereby controlling the forward movement speed of the screw in a feedback manner. In this controlling method, the target internal pressure in the pressure holding step is set at a constant value. Therefore, if mismolding occurs such as burrs, shrinkage cavity or wrinkling, much labor and many steps are required to adjust conditions for molding a good product. Furthermore, the number of types of products is limited whose quality can be improved by this controlling method.

Moreover, in the controlling method for Japanese Patent No. 2756077, the internal pressure of the mold is measured only at a single point. Therefore, if an abnormally excessive pressure is generated at a site other than the pressure detecting point within the cavity, mismolding may sometimes occur around the site.

BRIEF SUMMARY OF THE INVENTION

The present invention has been achieved to overcome the problems associated with a conventional method for controlling the forward movement speed of the screw in an injection-molding machine. A first object of the present invention is to provide a controlling method capable of finding controlling conditions in fewer test operations when mismolding occurs or the production of a new product is initiated. A second object of the present invention is to provide a controlling method for improving products in quality and yield by preventing the pressure of a mold from being generated excessively large.

According to a first aspect of the present invention, there is provided a method for controlling a forward movement speed of a screw in an injection molding machine in which a molten resin stored in a heating barrel is fed into a mold by advancing the screw within the heating barrel, comprising:

controlling the forward movement speed of the screw in accordance with a predetermined speed pattern after the initiation of the forward movement until the screw reaches a predetermined deceleration initiation point;

measuring an internal pressure of the mold and controlling the forward movement speed of the screw in a feedback control manner such that the internal pressure reaches a predetermined pressure, from the deceleration initiation point to a predetermined pressure holding initiation point, said feedback control being performed using a first set of PID (proportional-plus-integral-plus-derivative) coefficients; and measuring the internal pressure of the mold and controlling the forward movement speed of the screw in a feedback control manner such that the internal pressure of the mold changes in accordance with a predetermined pattern of target pressure versus time, after the screw reaches the pressure holding initiation point, said feedback control being performed using a second set of PID coefficients.

According to the method for controlling the forward movement speed of the present invention, the target pressure of the mold in the pressure holding step (which is performed after the screw reaches the pressure holding initiation point) is not necessary to correspond to that of the deceleration step (performed from the deceleration initiation point to the pressure holding initiation point). The target internal pressure of the mold during the pressure holding step can be set at a more appropriate value or controlled in accordance with more appropriate pattern, compared to a conventional method. As a result, it is possible to determine appropriate control conditions in fewer trial operations than in the conventional controlling method. Furthermore, a larger number of types of molded products can be formed by the controlling method of the present invention compared to conventional controlling methods.

Furthermore, the set of PID coefficients in the PID operation expression within a feedback loop are replaced by different set of PID coefficients when the screw reaches the pressure holding initiation point. Thereby, it is possible to change the internal pressure of the mold in the form of a smooth curve.

In the case where the internal pressure of the mold is changed in accordance with the program, for example, the target pressure is switched stepwise as time passes after the screw reaches the pressure holding initiation point.

In this case, it is preferable that the integral term of a PID operation expression within a feedback control loop be cleared and replaced by zero when the target pressure is switched stepwise as time passes.

As a modification of the controlling method, the pressure holding step may be initiated when the time elapsed from the initiation of the forward movement of the screw reaches a predetermined time (called a pressure holding initiation time).

According to a second aspect of the present invention, there is provided a method for controlling a forward movement speed of a screw in an injection molding machine in which a molten resin stored in a heating barrel is fed into a mold by advancing the screw within the heating barrel, comprising:

controlling the forward movement speed of the screw in accordance with a predetermined speed pattern after the initiation of the forward movement until the screw reaches a predetermined deceleration initiation point;

measuring an internal pressure of the mold at a plurality of points within the mold and controlling the forward movement speed of the screw in a feedback control manner such that the highest of internal pressures thus measured reaches a first target pressure, from the deceleration initiation point to a predetermined pressure holding initiation point, said feedback control being performed using a first set of PID coefficients; and measuring the internal pressure of the mold at the plurality of points within the mold and controlling the forward movement speed of the screw in a feedback control manner such that the highest internal pressure is maintained at a second target pressure, after the screw reaches the pressure holding initiation point, said feedback control being performed using a second set of PID coefficients.

According to the method for controlling the forward movement speed of a screw of the present invention, the forward movement speed of the screw is controlled in such a manner that the highest of internal pressures (of those measured at a plurality of points within the mold) corresponds to the target pressure after the screw reaches the deceleration initiation point. It is therefore possible to prevent generation of an excessive large pressure within the mold.

Furthermore, the set of PID coefficients in the PID operation expression within the feedback loop are replaced by different set of PID coefficients when the screw reaches the pressure holding initiation point. Thereby, it is possible to change the internal pressure of the mold in the form of a smooth curve.

It is preferable that, after the screw reaches the pressure holding initiation point, the forward movement speed of the screw is controlled using a second set of coefficients and in accordance with a program such that the highest internal pressure changes in accordance with a predetermined pattern of target pressure versus time.

As a modification of the controlling method mentioned above, the pressure holding step may be initiated when the time elapsed from the initiation of the forward movement of the screw reaches a predetermined time (called a pressure holding initiation time).

The method for controlling the forward movement speed of a screw according to the present invention can be applied to not only a hydraulic injection-molding machine in which the screw is driven by a hydraulic cylinder but also an electric injection-molding machine in which the screw is driven by an electric motor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION (Embodiment 1)

Figure 1:
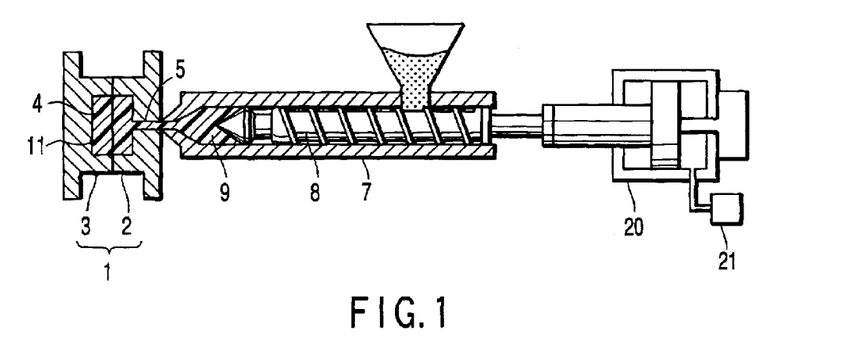
FIG. 1 is a schematic structure of an injection-molding machine to which the method for controlling the forward movement speed of a screw according to the present invention is applied.

FIG. 1 shows a schematic structure of an injection-molding machine employing the first embodiment of the method for controlling the forward movement speed of a screw according to the present invention.

A mold 1 is formed of a stationary die 2 and a movable die 3. A cavity 4 to be filled with a molten resin 9 is formed between the stationary die 2 and the movable die 3 (within the mold 1). A gate 5 is formed on the back surface of the stationary die 2 for introducing the molten resin into the cavity 4. The tip of a heating barrel 7 is connected to the gate 5 at the back surface of the stationary die 2. A screw 8 is housed within the heating barrel 7. A hydraulic cylinder 20 is connected to the rear end of the screw 8 for driving the screw 8 back and forth. A pressure detector 11 is embedded in the die surface of the cavity 4 for detecting the pressure of a molten resin 9 in the cavity 4. The hydraulic cylinder 20 is equipped with a pressure detector 21 for detecting the hydraulic pressure within the cylinder. After a resin is introduced into the heating barrel 7 and melted, the screw 8 is advanced within the heating barrel 7 to fill the cavity 4 with the molten resin 9.

Figure 2:
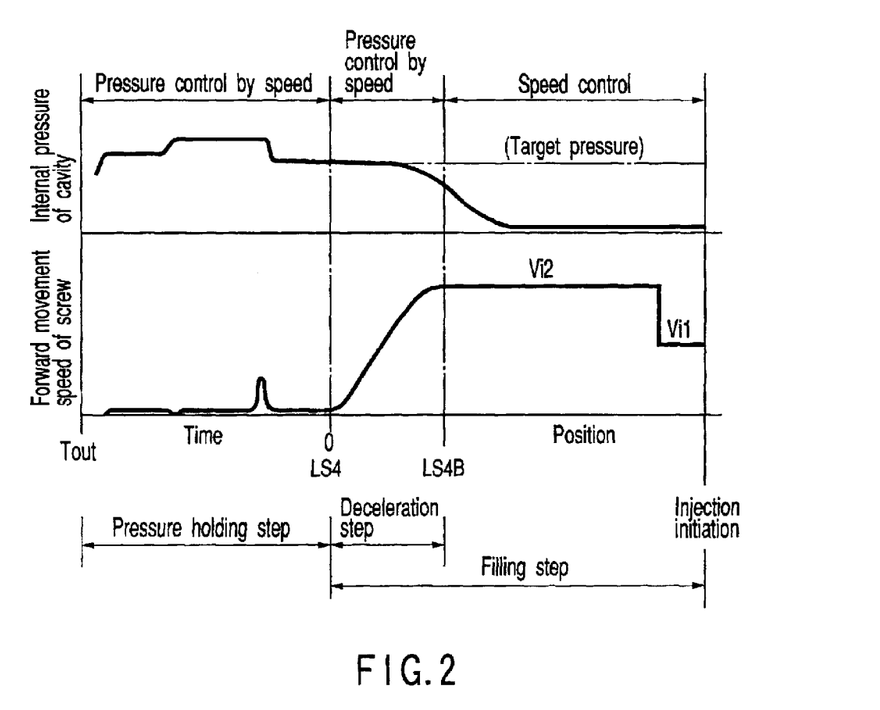
FIG. 2 is a graph showing a method for controlling the forward movement speed of a screw according to the present invention.

FIG. 2 shows the first embodiment of the method for controlling the forward movement speed of a screw according to the present invention. In this figure, the horizontal axis, from the right end up to LS4, represents the position of the screw 8, whereas the horizontal axis, from LS4 up to the left end, represents time. The upper stage of the graph indicates the internal pressure of the cavity 4 of the mold 1. The lower stage indicates the forward movement speed of the screw 8. The operation of injecting the molten resin 9 into the cavity 4 of the mold 1 proceeds from the right end toward the left end of the horizontal axis.

In the filling step, the forward movement speed of the screw is controlled in accordance with the predetermined speed pattern after the initiation of the injection operation until the screw reaches the deceleration initiation point, LS4B. In this example, the forward movement speed is switched stepwise from a speed Vi1 to a speed Vi2.

When the screw reaches the deceleration initiation point, LS4B, the decelerating step is started. In the decelerating step, the forward movement speed is controlled in a feedback manner such that the internal pressure of the mold 1 reaches a predetermined target pressure by using the internal pressure of the mold 1 as a control variable and the forward movement speed of the screw as a control input.

When the deceleration step is initiated, the initial value of the integral term of PID operation expression within the feedback control loop is set at an appropriate value except zero. Thereby the forward movement speed can be gradually decreased.

In this embodiment, to agree the instruction speed obtained from the PID operation with the speed (Vi2), the initial value of the integral term is inversely calculated through the PID operation from an actually measured internal pressure of the mold 1, and the initial value thus calculated is automatically given to the PID operation expression.

When the screw reaches the pressure holding initiation point, LS4, the pressure holding step is initiated. In the pressure holding step, the forward movement speed of the screw is controlled in a feedback manner such that the internal pressure of the mold 1 corresponds to a predetermined target pressure by using the internal pressure of the mold 1 as a control variable and the forward movement speed of the screw as a control input.

In this embodiment, the control is performed in accordance with the program as shown in FIG. 2. The target pressure in the pressure holding step is changed stepwise at multiple time points after the screw reaches the pressure holding initiation point, LS4. When the operation goes from the deceleration step to the pressure holding step, individual coefficients of the PID operation expression within the feedback control loop are replaced by new values different from those used during the deceleration step.

The pressure holding step is terminated when a predetermined pressure holding time, Tout, passes after the screw reaches the pressure holding initiation point, LS4.

A test production is previously performed to determine the predetermined pressures of individual steps, timing of switching the steps, and individual coefficients of the PID operation expression.

Note that, in the pressure holding step, when the target pressure is changed stepwise, it is preferable the integral term of the PID operation expression within the feedback control loop be cleared and replaced by zero. This is because if a big value is left in the integral term, it will sometimes disturb the control operation based on a target pressure newly given.

According to the method for controlling the forward movement speed of a screw, the target internal pressure of the mold 1 during the pressure holding step can be set at a more appropriate value or controlled in accordance with more appropriate pattern, compared to conventional methods. As a result, it is possible to determine appropriate control conditions in fewer trials compared to the conventional controlling methods. In addition, a larger number of types of molded products can be formed by the controlling method of the present invention compared to conventional controlling methods.

(Embodiment 2)

Figure 3:
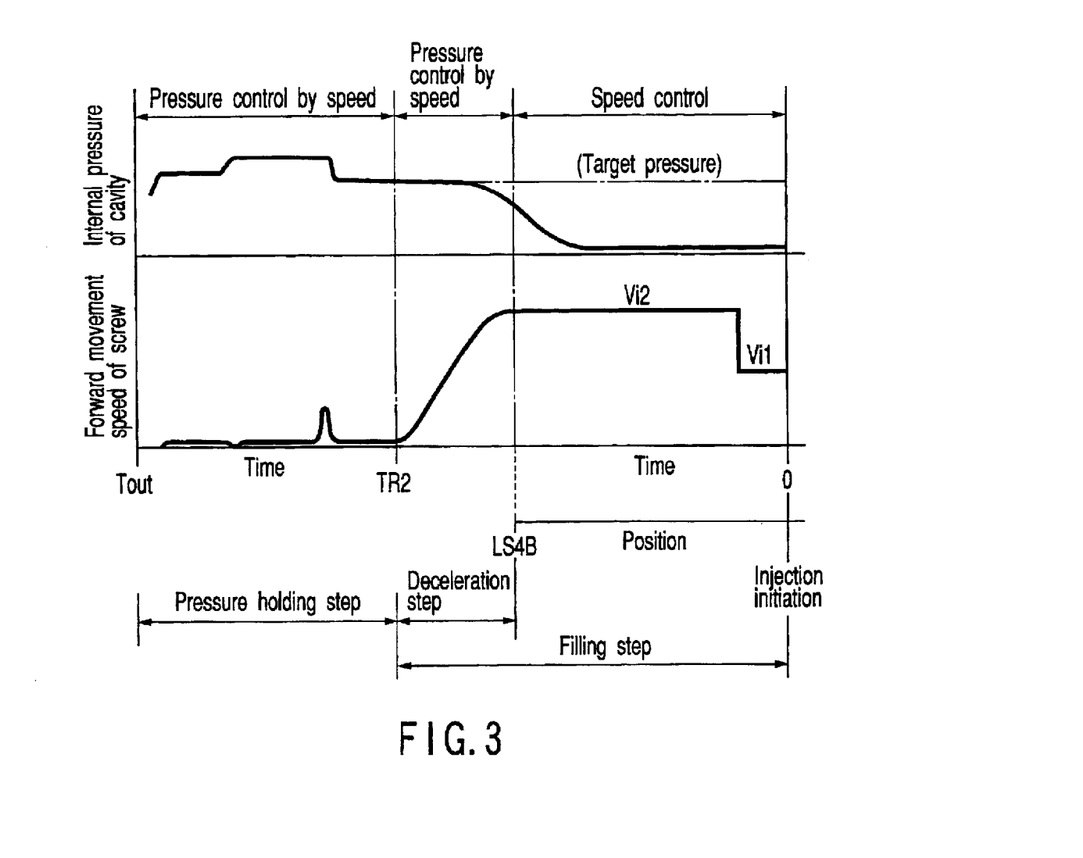
FIG. 3 is a graph showing another method for controlling the forward movement speed of a screw according to the present invention.

FIG. 3 shows the second embodiment of the method for controlling the forward movement speed of a screw according to the present invention. In this figure, a first horizontal axis represents the time that passes after the injection of the mold is started. A second horizontal axis drawn under the first horizontal axis represents the position of the screw 8. Embodiment 2 is a modification of Embodiment 1. The point at which the operation goes from the deceleration step to the pressure holding step is defined by the time that passes from the initiation of the forward movement of the screw in place of the position of the screw. In other words, the pressure holding step is initiated at a predetermined time (called "pressure holding initiation time" TR2) after the initiation of the forward movement of the screw. The control conditions for other elements are the same as in Embodiment 1.

(Embodiment 3)

Figure 4:
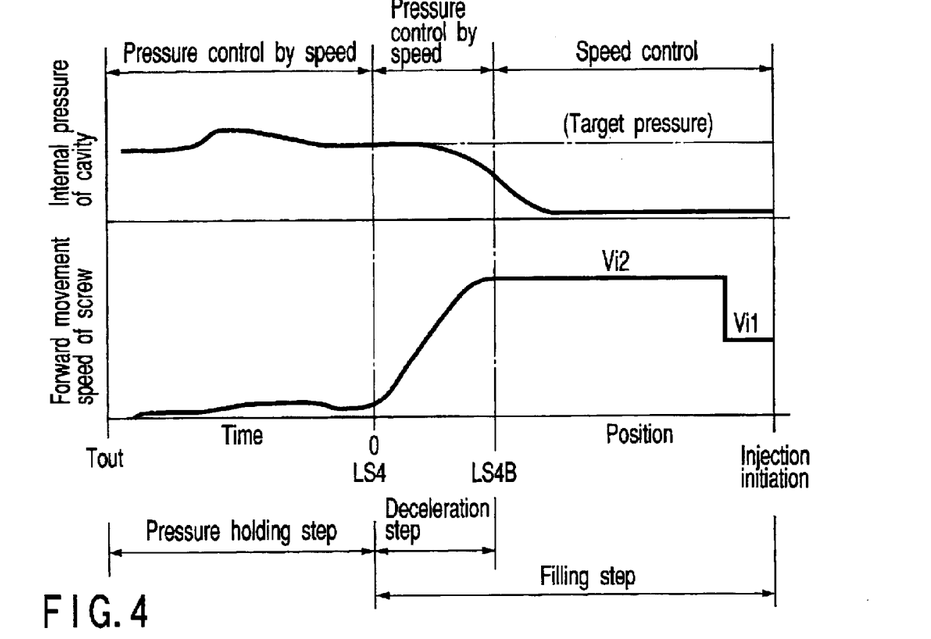
FIG. 4 is a graph showing another method for controlling the forward movement speed of a screw according to the present invention.

FIG. 4 shows the third embodiment of the method for controlling the forward movement speed of a screw according to the present invention. The injection-molding machine to which this method is to be applied comprises the same structural elements as shown in FIG. 1.

In a filling step, the forward movement speed of the screw is controlled in accordance with a predetermined speed pattern and in the same manner as in Embodiment 1.

When the screw reaches the deceleration initiation point, LS4B, the deceleration initiation step is started. In the deceleration step, the forward movement speed of the screw is controlled in a feedback manner such that the internal pressure of the mold 1 reaches a predetermined target pressure by using the internal pressure of the mold 1 as a control variable and the forward movement speed of the screw as a control input, in the same manner as in Embodiment 1.

When the screw reaches a pressure holding initiation point, LS4, the pressure holding step is started. In the pressure holding step, the forward movement speed of the screw is controlled in a feedback manner such that the internal pressure of the mold 1 corresponds to a predetermined target pressure by using the internal pressure of the mold 1 as a control variable and the forward movement speed of the screw as a control input.

In this embodiment, the control is performed in accordance with a program, as shown in FIG. 4. The target pressure in the pressure holding step is changed with time in accordance with a predetermined curve pattern after the screw reaches the pressure holding initiation point, LS4.

Furthermore, when the operation goes from the deceleration step to the pressure holding step, individual coefficients of the PID operation expression within the feedback control loop are replaced by new values different from those used during the deceleration step.

The pressure holding step is terminated when a predetermined holding time, Tout, passes after the screw reaches the pressure holding initiation point, LS4.

A test production is previously performed to determine the predetermined pressures of individual steps, timing of switching the steps, and individual coefficients of the PID operation expression.

(Embodiment 4)

Figure 5:
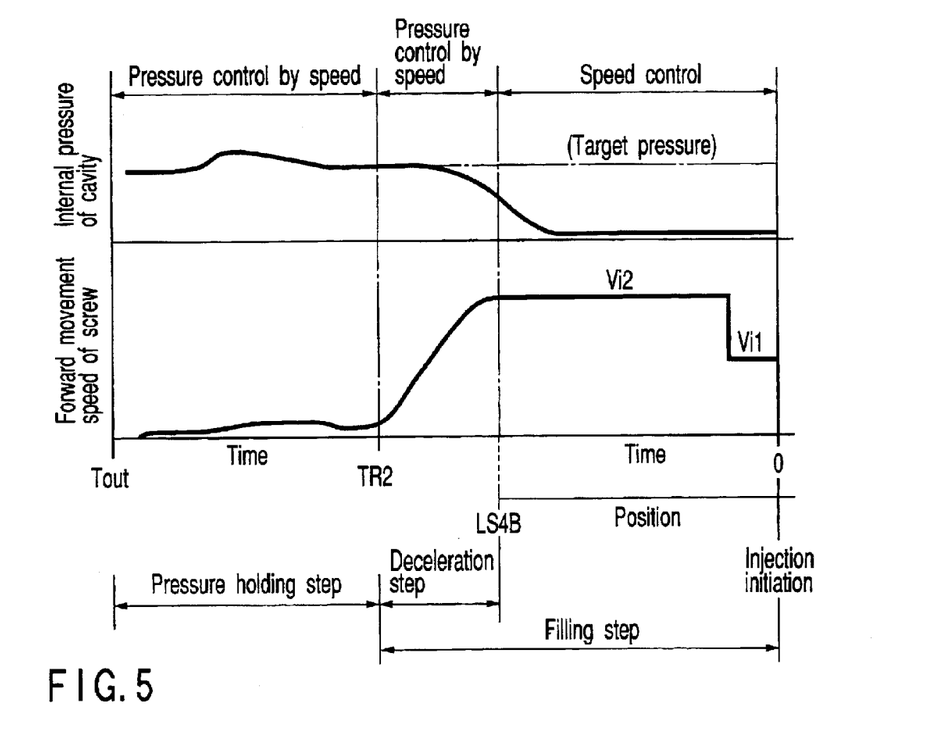
FIG. 5 is a graph showing another method for controlling the forward movement speed of a screw according to the present invention.

FIG. 5 shows the fourth embodiment of the method for controlling the forward movement speed of a screw according to the present invention. In this figure, a first horizontal axis represents the time that passes after the injection of the mold is started. A second horizontal axis drawn under the first horizontal axis represents the position of the screw 8. Embodiment 4 is a modification of Embodiment 3. The point at which the operation goes from the deceleration step to the pressure holding step is defined by the time that passes from the initiation of the forward movement of the screw in place of the position of the screw. In other words, the pressure holding step is initiated at a predetermined time (called "pressure holding initiation time" TR2) after the screw initiates its forward movement. The control conditions for other elements are the same as in Embodiment 3.

(Embodiment 5)

Figure 6:
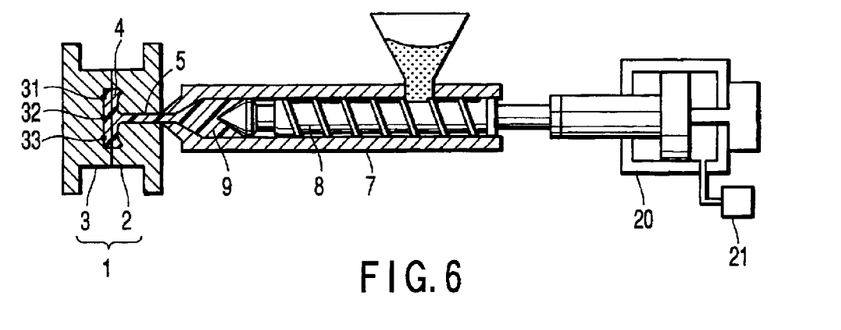
FIG. 6 is a schematic structure of an injection-molding machine to which the method for controlling the forward movement speed of a screw according to the present invention is applied.

FIG. 6 shows a schematic structure of an injection-molding machine employing the fifth embodiment of the method for controlling the forward movement speed of a screw according to the present invention.

A mold 1 is formed of a stationary die 2 and a movable die 3. A cavity 4 to be filled with a molten resin 9 is formed between the stationary die 2 and the movable die 3 (within the mold 1). A gate 5 is formed on the back surface of the stationary die 2 for introducing the molten resin 9 into the cavity 4. The tip of a heating barrel 7 is connected to the gate 5 at the back surface of the stationary die 2. A screw 8 is housed within the heating barrel 7. A hydraulic cylinder 20 is connected to the rear end of the screw 8 for moving the screw 8 back and forth. A pressure detectors 31, 32, and 33 are embedded in a plurality of sites of the die surface of the cavity 4 for detecting the pressure distribution of a molten resin 9 within the cavity 4. The hydraulic cylinder 20 is equipped with a pressure detector 21 for detecting the hydraulic pressure within the cylinder. After a resin is introduced into the heating barrel 7 and melted it, the screw 8 is advanced within the heating barrel 7 to fill the cavity 4 with the molten resin 9.

Figure 7:
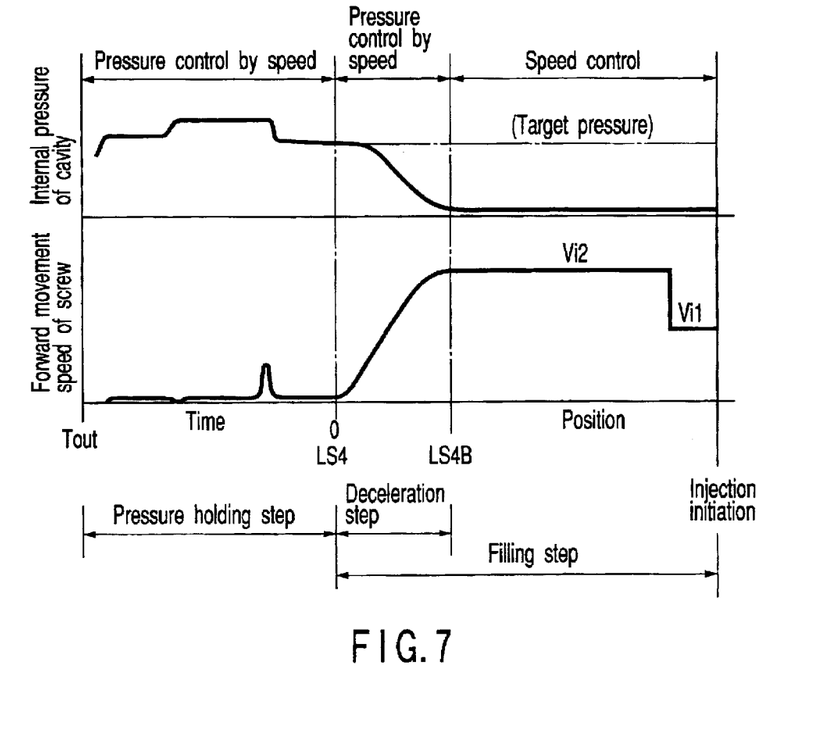
FIG. 7 is a graph showing another method for controlling the forward movement speed of a screw according to the present invention.
Figure 8:
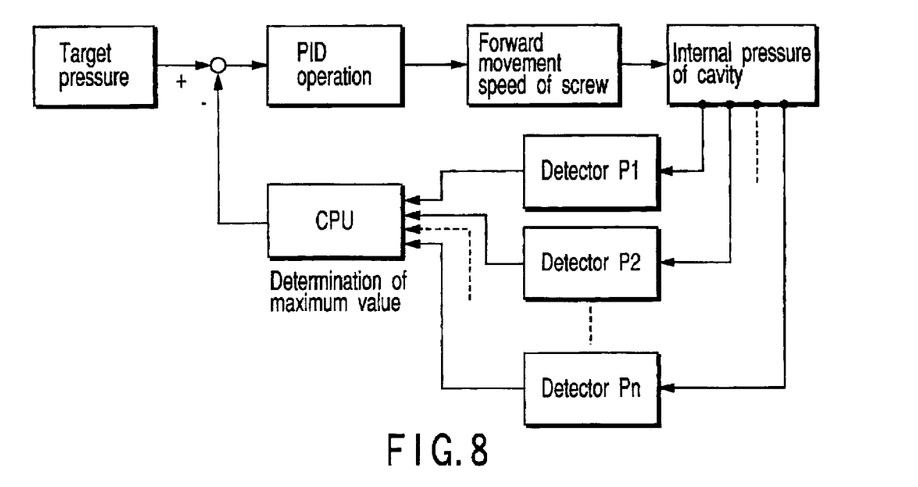
FIG. 8 is a schematic diagram showing the structure of a feedback controlling system used in the pressure holding step according to the method for controlling the forward movement speed of a screw of the present invention.

FIGS. 7 and 8 show the fifth embodiment of the method for controlling the forward movement speed of a screw according to the present invention.

In FIG. 7, the horizontal axis, from the right end to LS4, represents the position of the screw 8, whereas the horizontal axis, from LS4 to the left end, represents time. The upper stage of the graph indicates the internal pressure of the cavity 4 of the mold 1. The lower stage indicates the forward movement speed of the screw 8. The operation of injecting the molten resin 9 into the cavity 4 of the mold 1 proceeds from the right end toward the left end of the horizontal axis.

In the filling step, the forward movement speed of the screw is controlled in accordance with the predetermined speed pattern after the initiation of the injection operation until the screw reaches the deceleration initiation point, LS4B. In this example, the forward movement speed is switched stepwise from a speed Vi1 to a speed Vi2.

When the screw reaches the deceleration initiation point, LS4B, the decelerating step is started. The internal pressure of the mold 1 is detected by the pressure detectors 31 to 33 provided at a plurality of sites within the cavity 4, as shown in FIG. 8. In the decelerating step, by using the maximum value of the internal pressures of the mold 1 thus measured as a control variable and the forward movement speed of the screw as a control input, the forward movement speed is controlled in a feedback manner such that the maximum internal pressure of the mold 1 reaches a predetermined target pressure.

When the deceleration step is initiated, the initial value of the integral term of a PID operation expression within the feedback control loop is set at an appropriate value except zero. Thereby, the forward movement speed can be gradually decreased.

Subsequently, when the screw reaches the pressure holding initiation point, LS4, the pressure holding step is initiated. In the pressure holding step, as is the same as in the deceleration step, the internal pressure of the mold 1 is detected by pressure detectors 31 to 33 (provided within the plurality of sites of the cavity). By using the maximum value of the internal pressures of the mold 1 thus measured as a control variable and the forward movement speed of the screw as a control input, the forward movement speed is controlled in a feedback manner such that the maximum internal pressure of the mold 1 reaches a predetermined target pressure.

In this embodiment, the control is performed in accordance with the program as shown in FIG. 7. The target pressure of the pressure holding step is changed stepwise at multiple time points after the screw reaches the pressure holding initiation point, LS4. When the program goes from the deceleration step to the pressure holding step, individual coefficients of the PID operation expression within the feedback control loop are replaced by new values different from those used during the deceleration step.

The pressure holding step is terminated when a predetermined holding time, Tout, passes after the screw reaches the pressure holding initiation point, LS4.

A test production previously performed to determine the predetermined pressures of individual steps, timing of switching the steps, and individual coefficients of the PID operation expression.

According to the method for controlling the forward speed of a screw mentioned above, since the generation of excessively large pressure within the mold 1 can be prevented, the product can be improved in quality and yield.

(Embodiment 6)

Figure 9:
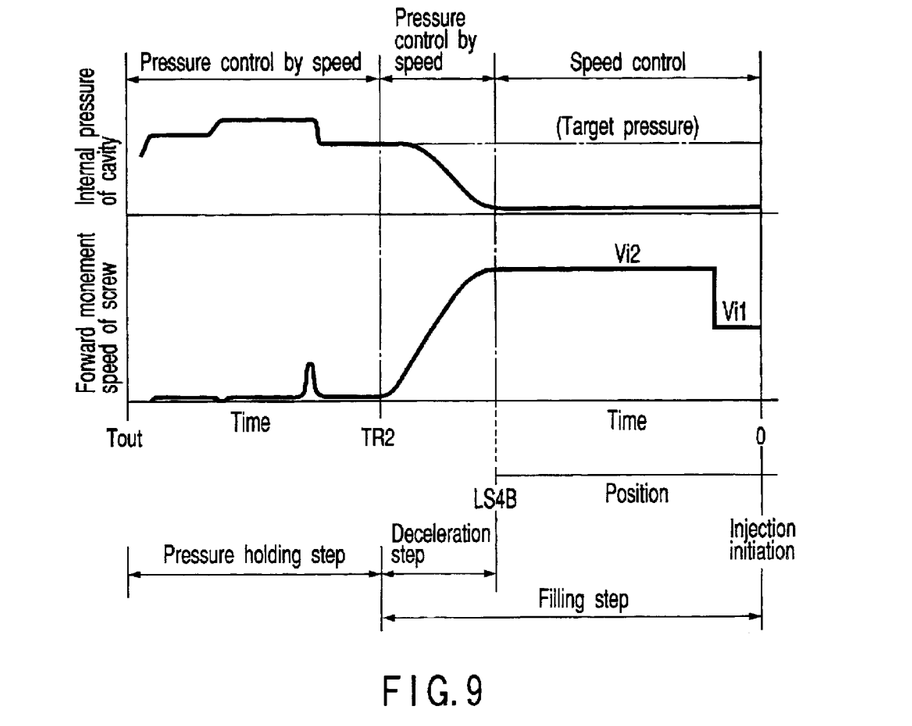
FIG. 9 is a graph showing another method for controlling the forward movement speed of a screw according to the present invention.

FIG. 9 shows the sixth embodiment of the method for controlling the forward movement speed of a screw according to the present invention. In this figure, a first horizontal axis represents the time that passes after the injection of the mold is started. A second horizontal axis drawn under the first horizontal axis represents the position of the screw 8. Embodiment 6 is a modification of Embodiment 5. The point at which the operation goes from the deceleration step to the pressure holding step is defined by time that passes from the initiation of the forward movement of the screw in place of the position of the screw. In other words, the pressure holding step is initiated at a predetermined time (called "pressure holding initiation time" TR2) after the screw initiates its forward movement. The control conditions for other elements are the same as in Embodiment 5.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for controlling a forward movement speed of a screw in an injection molding machine in which a molten resin stored in a heating barrel is fed into a mold by advancing the screw within the heating barrel, comprising:

controlling the forward movement speed of the screw in accordance with a predetermined speed pattern after the initiation of the forward movement until the screw reaches a predetermined deceleration initiation point;

measuring an internal pressure of the mold and controlling the forward movement speed of the screw in a feedback manner such that the internal pressure reaches a predetermined pressure, after the screw reaches the deceleration point, until the time elapsed from the initiation of the forward movement of the screw reaches a predetermined pressure holding initiation time, said feedback control being performed using a first set of PID coefficients; and measuring the internal pressure speed of the mold and controlling the forward movement speed of the screw in a feedback control manner such that the internal pressure of the mold changes in accordance with a predetermined pattern of target pressure versus time, after the time elapsed from the initiation of forward movement of the screw reaches the pressure holding initiation time, said feedback control being performed using second set of PID) coefficients.

2. A method according to claim 1, wherein said target pressure is switched stepwise as time passes after the screw reaches the pressure holding initiation time.

3. A method according to claim 2, wherein an integral term of the PID operation expression within a feedback control loop is cleared and replaced by zero when the target pressure is switched stepwise as time passes.

4. A method for controlling a forward movement speed of a screw in an injection molding machine in which a molten resin stored in a heating barrel is fed into a mold by advancing the screw within the heating barrel, comprising:

controlling the forward movement speed of the screw in accordance with a predetermined speed pattern after the initiation of the forward movement until the screw reaches a predetermined deceleration initiation point;

measuring an internal pressure of the mold at a plurality of points within the mold and controlling the forward movement speed of the screw in a feedback control manner such that the highest of internal pressures thus measured reaches a first target pressure, after the screw reaches the deceleration initiation point, until the time elapsed from the initiation of the forward movement of the screw reaches a predetermined pressure holding initiation time, said feedback control being performed using a first set of PID coefficients; and measuring the internal pressure of the mold at the plurality of points within the mold and controlling the forward movement speed of the screw in a feedback control manner such that the highest internal pressure is maintained at a second target pressure, after the time elapsed from the initiation of forward movement of the screw reaches the pressure holding initiation time, said feedback control being performed using a second set of PID coefficients.

5. A method for controlling a forward movement speed of a screw in an injection molding machine in which a molten resin stored in a heating barrel is fed into a mold by advancing the screw within the heating barrel, comprising:

controlling the forward movement speed of the screw in accordance with a predetermined speed pattern after the initiation of the forward movement until the screw reaches a predetermined deceleration initiation point;

measuring an internal pressure of the mold at a plurality of points within the mold and controlling the forward movement speed of the screw in a feedback control manner such that the highest of internal pressures thus measured reaches a target pressure, after the screw reaches the deceleration initiation point, until the time elapsed from the initiation of forward movement of the screw reaches a predetermined pressure holding initiation time, said feedback control being performed using a first set of PID coefficients; and measuring the internal pressure of the mold at a plurality of points within the mold and controlling the forward movement speed of the screw in a feedback control manner such that the highest internal pressure is changed in accordance with a predetermined pattern of target pressure versus time, after the time elapsed from the initiation of forward movement of the screw reaches the pressure holding initiation time, said feedback control being performed using a second set of PID coefficients.

* * * * *

UNITED STATES PATENT AND TRADEMARK OFFICE
CERTIFICATE OF CORRECTION

PATENT NO. : 6,835,337 B2 Page 1 of 1
APPLICATION NO. : 10/133592
DATED : December 28, 2004
INVENTOR(S) : Kiyoshi Sasaki et al.

It is certified that error appears in the above-identified patent and that said Letters Patent is hereby corrected as shown below:

On title page, item 73 Assignee
        replace Munekata Co., Ltd, Fukushima (JP)

with --Toshiba Machine Co., Ltd., Tokyo (JP)
    Munekata Co., Ltd., Fukushima (JP)--

Signed and Sealed this

Thirteenth Day of July, 2010

David J. Kappos
*Director of the United States Patent and Trademark Office*